United States Patent
Brülhart et al.

(10) Patent No.: US 9,399,592 B2
(45) Date of Patent: Jul. 26, 2016

(54) METHOD FOR RECOVERING PHOSPHORUS-CONTAINING ALTERNATIVE FUELS IN CEMENT PRODUCTION

(75) Inventors: Marc Brülhart, Wollerau (CH); Frank O. Ernst, Zürich (CH); Luiz Carlos Reichenbach De Sousa, Greifensee (CH)

(73) Assignee: HOLCIM TECHNOLOGY LTD, Rapperswil-Jona (CH)

( * ) Notice: Subject to any disclaimer, the term of this patent is extended or adjusted under 35 U.S.C. 154(b) by 998 days.

(21) Appl. No.: 13/519,623

(22) PCT Filed: Dec. 15, 2010

(86) PCT No.: PCT/IB2010/003265
§ 371 (c)(1),
(2), (4) Date: Aug. 28, 2012

(87) PCT Pub. No.: WO2011/080558
PCT Pub. Date: Jul. 7, 2011

(65) Prior Publication Data
US 2013/0004907 A1    Jan. 3, 2013

(30) Foreign Application Priority Data

Dec. 28, 2009 (AT) .................. A2042/2009

(51) Int. Cl.
*F27B 7/00* (2006.01)
*C02F 11/18* (2006.01)
(Continued)

(52) U.S. Cl.
CPC ............... *C02F 11/18* (2013.01); *C02F 11/00* (2013.01); *C02F 11/12* (2013.01); *C04B 7/4423* (2013.01);
(Continued)

(58) Field of Classification Search
CPC .... C02F 11/18; C02F 11/12; C02F 2101/105; C02F 2103/12; C02F 2101/20; C02F 11/00; C02B 7/4423
USPC ................................................. 432/2
See application file for complete search history.

(56) References Cited

U.S. PATENT DOCUMENTS 4,678,514 A * 7/1987 Deyhle .................. C04B 7/4446
106/745
5,259,876 A * 11/1993 Enkegaard .................. 106/761
(Continued)

FOREIGN PATENT DOCUMENTS

AT    503 073 A1    7/2007
CN    1398336 A    2/2003
(Continued)

OTHER PUBLICATIONS

EP_1669467A1_Machine_Translation.*
(Continued)

*Primary Examiner* — Alissa Tompkins
*Assistant Examiner* — John Bargero
(74) *Attorney, Agent, or Firm* — Fitch, Even, Tabin & Flannery LLP

(57) ABSTRACT

In a method for utilizing phosphorus-containing alternative fuels in the cement clinker production, the alternative fuels are thermolyzed using waste heat from the cement clinker production process in a thermolysis reactor different from a rotary kiln of the cement clinker production process, the energy released thereby is supplied to the cement clinker production process, and the thermolysis residues of the phosphorus-containing alternative fuels are discharged from the thermolysis reactor, so that the thermolysis residues of the phosphorus-containing alternative fuels are mixed in the thermolysis reactor with cement kiln bypass products as halogen carriers and the heavy-metal halides produced are drawn off.

15 Claims, 1 Drawing Sheet

(51) Int. Cl.
*C02F 11/00* (2006.01)
*C04B 7/44* (2006.01)
*C02F 11/12* (2006.01)
*C02F 101/10* (2006.01)
*C02F 101/20* (2006.01)
*C02F 103/12* (2006.01)

(52) U.S. Cl.
CPC ....... *C02F 2101/105* (2013.01); *C02F 2101/20* (2013.01); *C02F 2103/12* (2013.01); *Y02P 40/126* (2015.11)

(56) References Cited

U.S. PATENT DOCUMENTS

| | | | |
|---|---|---|---|
| 6,244,199 B1 * | 6/2001 | Chambe et al. | 110/346 |
| 7,189,074 B2 | 3/2007 | Leung et al. | |
| 2005/0039638 A1 | 2/2005 | Leung et al. | |
| 2005/0274293 A1 * | 12/2005 | Morton | C04B 7/4407 106/745 |
| 2007/0179673 A1 * | 8/2007 | Phillips et al. | 700/271 |
| 2009/0183543 A1 | 7/2009 | Boutoussov | |
| 2009/0239279 A1 * | 9/2009 | Hall | C10G 2/32 435/167 |
| 2009/0283015 A1 * | 11/2009 | Gasser et al. | 106/638 |

FOREIGN PATENT DOCUMENTS

| | | |
|---|---|---|
| DE | 3330667 A1 | 3/1985 |
| DE | 3411144 A1 | 10/1985 |
| EP | 1 669 467 A1 | 6/2006 |
| JP | S60-221349 A | 11/1985 |
| JP | 2001-321749 A | 11/2001 |
| JP | 2002-052397 A | 2/2002 |
| JP | 2003-506299 A | 2/2003 |
| WO | 01/09548 A1 | 2/2001 |

OTHER PUBLICATIONS

International Search Report dated Apr. 12, 2011, corresponding to International Application PCT/IB2010/003265.

* cited by examiner

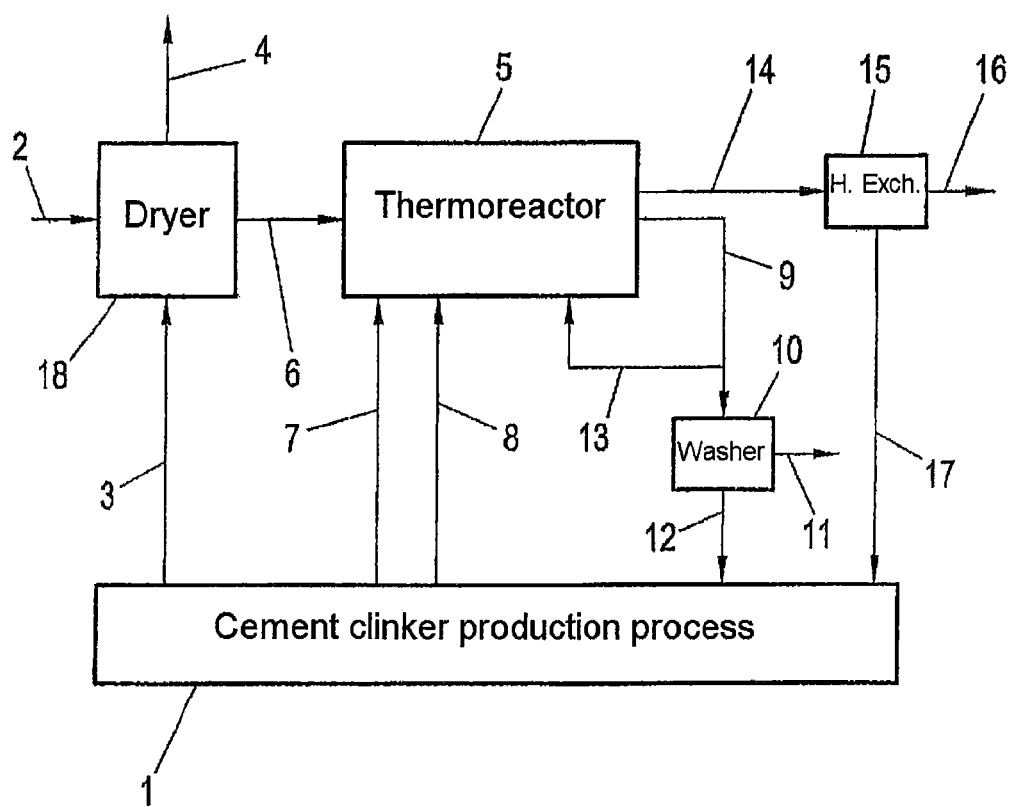

METHOD FOR RECOVERING PHOSPHORUS-CONTAINING ALTERNATIVE FUELS IN CEMENT PRODUCTION

CROSS-REFERENCE TO RELATED APPLICATIONS

This is a U.S. National Phase of International Application PCT/IB2010/003265, filed Dec. 15, 2010, and claims the benefit of foreign priority from Austrian Patent Application A 2042/2009, filed Dec. 28, 2009, the entire disclosures of which applications are hereby incorporated herein by reference.

The present invention relates to a method for utilizing phosphorus-containing alternative fuels in cement clinker production, wherein the alternative fuels are thermolyzed using waste heat from the cement clinker production process in a thermolysis reactor different from a rotary kiln of the cement clinker production process, the energy thereby released is supplied to the cement clinker production process, and the thermolysis residues of the phosphorus-containing alternative fuels are discharged from the thermolysis reactor.

In cement clinker production, raw cement powder is pre-heated and calcined, whereby $CO_2$ escapes. This is followed by the actual burning in a rotary kiln, whereupon with cooling of the burnt clinker a hydraulic product results. In total, considerable amounts of energy are used for these processes, and there are constant attempts to recover the energy spent, if possible, and to reuse it for the process as best as possible. Furthermore, there are efforts to use alternative fuels for the cement clinker production process, i.e. fuels with a reduced heating value compared to high-quality natural gas or petroleum, whereby such alternative fuels are frequently available in the form of wastes. Alternative fuels are normally not as flammable as conventional fuels, like for example petroleum and natural gas, and therefore can only be used in a limited fashion in the burners of the rotary kiln or the calcinator, respectively. Therefore, such alternative fuels are frequently digested or burnt in separate pyrolysis or thermolysis reactors, respectively. Upon utilizing only small amounts of alternative fuels in the form of wastes, the ash or slag, respectively, resulting therefrom can be introduced into the clinker kiln and thus absorbed and bound in the product of the cement clinker production process. If, however, larger amounts of the stated alternative fuels are to be used, then the relatively large amounts of thermolysis residues resulting therefrom would have negative impacts on the setting behavior and the stability of the clinker produced. For example, it is known that phosphorus, which can be included in the thermolysis residues, affects the early stability of cement.

In order to avoid the negative impact of too large amounts of ash or slag, respectively, in the cement clinker, a method was suggested in the German Patent Application DE 34 11 144 A1, for example, in which for the utilization of combustible wastes, the waste is combusted in a separated fashion, and the flue gas resulting therefrom is used for calcination. In this connection, the slag from waste combustion is removed in a separated fashion, so that the disadvantages stated above can be avoided. This document describes that heavy metals and heavy-metal compounds, which likewise originate from the used wastes, are discharged with the exhaust gases in the form of their chlorides or fluorides, and are absorbed by the raw cement powder upon contact of the exhaust gases with the raw cement powder. In this method, the thermolysis residues of the alternative fuels are discharged into a water bath and not supplied to any special further utilization.

In order to be able to use the phosphorus content of the alternative fuels stated above as e.g. fertilizer, which can be used on agricultural land, a particularly thorough removal of possibly existing heavy metals and heavy-metal compounds is of course required, which is why an increased supply of halogens is required in order to remove the heavy metals and heavy-metal compounds in form of their halides from the thermolysis residue.

In cement clinker production, chlorine or chlorides, respectively, tend to form cycles in the cement kiln, which promote the formation of caking in the kiln's inflow area, in the riser duct or in the area of the cyclone pre-heater/heat exchanger. Caused by the high temperatures in the rotary kiln, the chlorides contained in the starting material and the alternative fuels evaporate, whereupon, when heat is extracted from the hot kiln gases, which, for example, is the case in heat exchangers, condensation of these chlorides takes place. Thus, the chlorides form a cycle, which results in an accumulation in the cement kiln or in the heat exchanger system, respectively. For depletion, chloride-loaded and dust-containing kiln gas is usually drawn off, and the chloride is removed from the dust by quenching. In case of a low chloride content, these chlorine-containing dusts can be returned into the cement production process. With high chlorine or chloride contents, respectively, the introduction of the cement kiln bypass dusts loaded in such fashion into the cement production process, however, is not desirable.

Thus, the invention is based on the object of improving a method of the type initially stated to the effect that the formation of chloride cycles in the cement clinker production process is reduced, and simultaneously a particularly effective removal of heavy metals from the thermolysis residues resulting from the utilization of alternative fuels is achieved, so that the thermolysis residues can be used as phosphorus-containing fertilizer, in which phosphorus is present in a form usable for plants.

In order to solve this object, a method of the type initially stated was further developed according to the invention to that extent that the thermolysis residues of the phosphorus-containing alternative fuels are mixed with cement kiln bypass products as halogen carriers in the thermolysis reactor, and the resulting heavy-metal halides are drawn off. Using cement kiln bypass products, which may be present as dusts and/or gases, as halogen carriers for the removal of heavy metals and heavy-metal compounds from the thermolysis residues of the phosphorus-containing alternative fuels, a sufficiently high chloride content is maintained in the thermolysis reactor in order to ensure a virtually complete depletion of the heavy metals and heavy-metal compounds from the thermolysis residue to be used as fertilizer. If, as is provided according to the invention, the resulting heavy-metal halides are drawn off and not introduced into the cement clinker production process, not only cement clinker largely free from heavy metals can be produced, but the heavy metals can also be supplied to a profitable utilization in the non-ferrous metal industry. On the whole, the cement kiln bypass products can be used in a new fashion, whereby a product usable as fertilizer is discharged from the utilization of the alternative fuels from the thermolysis reactor and the cement clinker production process, which is virtually free from heavy-metal residues, and an additional economic benefit is achieved with the recovery of precious heavy metals by treatment of the drawn-off heavy-metal halides according to methods known in the state of the art.

In order to recover the chlorides, it may be beneficial to proceed within the scope of the invention in such that dust-loaded and chloride-containing kiln gas is drawn off as a cement kiln bypass product and led into the thermolysis reactor. In this case, the kiln gas is drawn off in the area of the kiln inflow and directly used for conversion of the heavy metals in the thermolysis reactor.

According to a preferred embodiment of the present invention, however, it may also be proceeded in such that the chloride content of cement kiln bypass dusts as a cement kiln bypass product is increased by quenching prior to the addition to the thermolysis residues of the phosphorus-containing alternative fuels in the thermolysis reactor, whereby a chloride-rich dust is formed, which has an increased chloride content compared to the raw powder. Upon quenching, the drawn off kiln flue gases are quickly cooled off, whereby the chlorine or chloride, respectively, contained in the gaseous phase condensates on the solid particles and can be used, after separation of the dust in a filter, for conversion in the thermolysis reactor.

In order to exploit a further chloride source for the removal of heavy metals from the thermolysis residues of the phosphorus-containing alternative fuels, it may be proceeded according to a preferred embodiment of the present invention, in such that in addition to the cement kiln bypass products, chloride-containing alternative fuels are used as halogen carriers.

In order to bring the phosphorus, which is present in the phosphorus-containing alternative fuels, into a form usable for plants, so that the thermolysis residues from the thermolysis reactor can be used as fertilizer, the thermolysis must be undertaken at sufficiently high temperatures. For this purpose, the invention has been advantageously further developed to that extent that the temperature in the thermolysis reactor is set between 600 and 1200° C. At these temperatures, mineralogical changes of the phosphorus take place, which allow plants to take up the phosphorus and make it available for the organism. As particularly preferred a procedure has been proven, in which the temperature in the thermolysis reactor is set between 800 and 1100° C.

In order to make the chemical energy bound in the phosphorus-containing alternative fuels available for the cement clinker production process, the method according to the invention preferably has been further developed to that extent that in the thermolysis reactor, oxidizing conditions are set, and the heat of the flue gas resulting from the thermolysis is introduced into the cement clinker production process, wherein the sensible heat of this flue gas is mainly used in the calcinator for calcinating the raw powder.

For the generation of a sufficiently oxidizing atmosphere for the formation of the hot flue gas, the method according to the invention preferably has been further developed to that extent that for setting oxidizing conditions, oxidizing agents in the form of ambient air, pre-heated air from the cement clinker production process, oxygen, $CO_2$ and/or water vapor are added. In that, the water vapor can be added to the process or originates from the moisture of the phosphorus-containing alternative fuels.

Alternatively to the generation of a hot flue gas, however, a fuel gas may also be formed from the alternative fuel by thermolysis. In that, the method has been advantageously further developed to that extent that reducing conditions are set in the thermolysis reactor, and the fuel gas resulting from thermolysis is combusted in the cement clinker production process, whereby such fuel gas is predominantly used in the main burner of the clinker kiln.

In principle, waste materials of various origins are perceivable as phosphorus-containing alternative fuels. However, within the scope of the invention it is considered as preferred, that sewage sludge is used as phosphorus-containing alternative fuel. Upon using sewage sludge, from the disposal of the sewage sludge with effective removal of heavy metals and the formation of a valuable fertilizer, in total, a synergistic integration of wastewater treatment, cement clinker production, fertilizer production and recovery of heavy metals results, whereby an optimal utilization of the present raw materials is achieved.

Sewage sludge normally has a relatively high moisture content, so that the method has been preferably further developed to that extent that the sewage sludge is dried prior to thermolysis, whereby in this connection it is preferably proceeded in such that, prior to thermolysis, the sewage sludge is dried up to a dry matter content of >60%.

In order to optimally use the amounts of heat present in the cement clinker production process, the invention has been advantageously further developed to that extent that for drying of the sewage sludge, heat from the cement clinker production process is used. For that, hot exhaust air from the clinker cooler is particularly suitable, whereby, depending on which area of the clinker cooler the exhaust air is taken from, various temperature levels are available.

In the following, the invention will be explained in more detail on the basis of an embodiment represented in the FIGURE.

FIG. 1 shows a flow chart of a system suitable for performing the method according to the invention.

In FIG. 1, 1 designates a cement clinker production plant, which essentially consists of a pre-heater and a calcinator, a rotary kiln and a clinker cooler. The phosphorus-containing alternative fuels used according to the invention are via line 2 supplied to a dryer 18, which serves increasing the dry matter content of the alternative fuels, which, for example, lies between 15 and 45%, for sewage sludge, to values between 60 and 100%. The heat required for that is supplied to the dryer via line 3, which is connected to the cement clinker production plant 1 and may for example contain drying air from the pre-heater or calcinator and in particular from the clinker cooler. Via line 4, the evaporated water is removed from the process.

The actual thermolysis of the alternative fuels takes place in the thermolysis reactor 5, which is supplied with the pre-dried alternative fuels via line 6. The thermolysis reactor is supplied with hot process air of the cement clinker production process via line 7 and, according to the invention, cement kiln bypass products are supplied via line 8. The thermolysis of the phosphorus-containing alternative fuels takes place in the thermolysis reactor, whereby the contained phosphorus is brought into a mineralogical form usable for plants. Simultaneously, possibly contained heavy metals are converted into volatile heavy-metal halides by the halogen carriers and in particular by chlorides introduced via line 8, whereby the halides are drawn off together with the gas resulting from the thermolysis via line 9. If the product gas is present as fuel gas, it is supplied to a washer 10. In the washer, the heavy-metal halides are converted into their solid form and can be discharged via line 11, whereas the gas resulting from the thermolysis is supplied to the cement clinker production process via line 12. Optionally, the product gas of the thermolysis may also be used for heating of the thermolysis reactor via line 13, if it is a flue gas, which was formed under oxidizing conditions.

The thermolysis residue from thermolysis, which contains phosphorus in a form utilizable for plants, is drawn off from the thermolysis reactor via line 14, supplied to a heat exchanger 15 for recovery of the heat, and discharged via line 16. The heat from the heat exchanger 15 may be supplied to the cement clinker production process via line 17.

The invention claimed is:

1. A method for utilizing phosphorus-containing alternative fuels in cement clinker production, comprising
    thermolyzing the phosphorus-containing alternative fuels using waste heat from a cement clinker production process in a thermolysis reactor different from a rotary kiln of a cement clinker production process,
    supplying the energy thereby released from the thermolyzing to the cement clinker production process,
    mixing thermolysis residues of the phosphorus-containing alternative fuels in the thermolysis reactor with cement kiln by-pass products as halogen carriers and drawing off the heavy-metal halides produced, wherein said chlorine-containing cement kiln by-pass products comprise cement kiln bypass dust, and
    discharging thermolysis residues of the phosphorus-containing alternative fuels from the thermolysis reactor.

2. The method according to claim 1, characterized in that the chloride content of cement kiln by: pass dusts as a cement kiln by pass product is increased by quenching prior to addition to said thermolysis residues of said phosphorus-containing alternative fuels in said thermolysis reactor.

3. The method according to claim 1, characterized in that, in addition to said cement kiln by-pass products, chlorine-containing alternative fuels are introduced into the thermolysis reactor as additional as halogen carriers.

4. The method according to claim 1, characterized in that the temperature in said thermolysis reactor is set between 600 and 1200° C.

5. The method according to claim 1, characterized in that said temperature in said thermolysis reactor is set between 800 and 1100° C.

6. The method according to claim 1, characterized in that oxidizing conditions in said thermolysis reactor are set and the heat of the flue gas resulting from thermolysis is introduced into said cement clinker production process.

7. The method according to claim 6, characterized in that for setting the oxidizing conditions, oxidizing agents in the form of ambient air, pre-heated air from the cement clinker production process, oxygen, $CO_2$ and/or water vapor are added.

8. The method according to claim 1, characterized in that reducing conditions are set in said thermolysis reactor and the fuel gas resulting from thermolysis is combusted in said cement clinker production process.

9. The method according to claim 1, characterized in that sewage sludge is used as said phosphorus-containing alternative fuel.

10. The method according to claim 9, characterized in that said sewage sludge is dried prior to thermolysis.

11. The method according to claim 9, characterized in that said sewage sludge is dried prior to thermolysis up to a dry matter content of >60%.

12. The method according to claim 9, characterized in that heat from said cement clinker production process is used for said drying of said sewage sludge.

13. A method for utilizing phosphorus-containing alternative fuel in cement clinker production, wherein the alternative fuel comprises sewage sludge, and said cement clinker production involves equipment including a pre-heater, a calcinator, a rotary kiln, and a clinker cooler, said method including
    (a) drying said sewage sludge to a dry matter content of >60%;
    (b) supplying said dried sewage sludge to a thermolysis reactor different from a rotary kiln of the cement clinker production process;
    (c) supplying halogen carriers to said thermolysis reactor, said halogen carriers for removing heavy metals from said dried sewage sludge as halide products and said halogen carriers comprising cement kiln bypass products and chlorine-containing alternative fuels;
    (d) thermolyzing said dried sewage sludge in the presence of said halogen carriers in said thermolysis reactor, wherein said thermolysis reactor is set to a temperature of between 600 and 1200° C., whereby a thermolysis residue and heavy metal halides are produced from heavy metals present in said dried sewage sludge, and energy released is recycled to the cement clinker production process;
    (e) drawing off said heavy-metal halides produced in the thermolyzing;
    (f) discharging the thermolysis residue from the thermolysis reactor; and
    (g) producing fertilizer from said thermolysis residue.

14. The method according to claim 13, wherein in drying said sewage sludge heat from said cement clinker production is used.

15. The method according to claim 13, wherein in (f) said thermolysis residue contains phosphorus.

* * * * *